United States Patent [19]

Mitchell James L.

[11] Patent Number: 5,013,063
[45] Date of Patent: May 7, 1991

[54] AIR RIDE SUSPENSION SYSTEM WITH RIGID BOLSTER BEAM AND SLIPPER LOAD BUSHING

[75] Inventor: Mitchell James L., Springfield, Mo.
[73] Assignee: Ridewell Corporation, Springfield, Mo.
[21] Appl. No.: 377,222
[22] Filed: Jul. 10, 1989
[51] Int. Cl.⁵ .......................... B60G 3/16; B60G 11/26
[52] U.S. Cl. .................................. 280/711; 280/712; 280/715
[58] Field of Search ............... 280/697, 698, 702, 711, 280/712, 715, 716; 267/35, 256, 257

[56] References Cited
U.S. PATENT DOCUMENTS

| | | | |
|---|---|---|---|
| 2,814,480 | 11/1957 | Clark et al. | 267/256 |
| 4,132,433 | 1/1979 | Willetts | 280/712 |
| 4,500,112 | 2/1985 | Raidel | 280/702 |
| 4,714,269 | 12/1987 | Raidel | 280/702 |
| 4,858,948 | 8/1989 | Raidel | 280/711 |

Primary Examiner—Charles A. Marmor
Assistant Examiner—Tamara L. Finlay
Attorney, Agent, or Firm—Rogers, Howell & Haferkamp

[57] ABSTRACT

An air ride suspension system for a vehicle comprises a hanger that is suspended from the vehicle chassis, a bolster beam that is pivotally connected with the hanger, a first spring positioned between a first end of a bolster beam and the hanger, a second spring posiitoned between a second end of the bolster beam and the vehicle chassis, where the vertical load borne by the vehicle is transferred through the first and second springs to the bolster beam and the vehicle axle and substantially none of the vertical load is borne by the pivot bushings providing the pivot connection between the hanger and bolster beam.

22 Claims, 3 Drawing Sheets

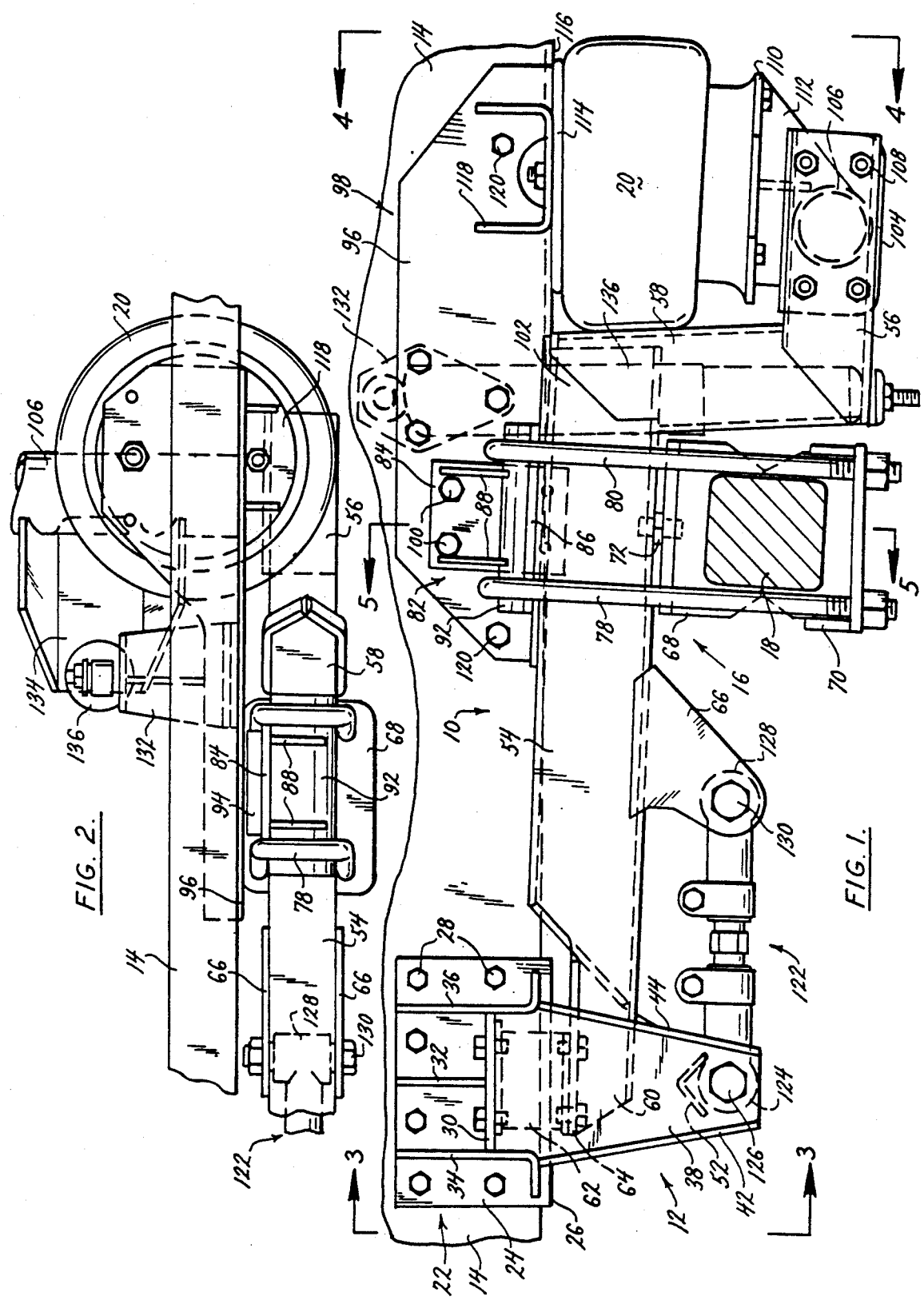

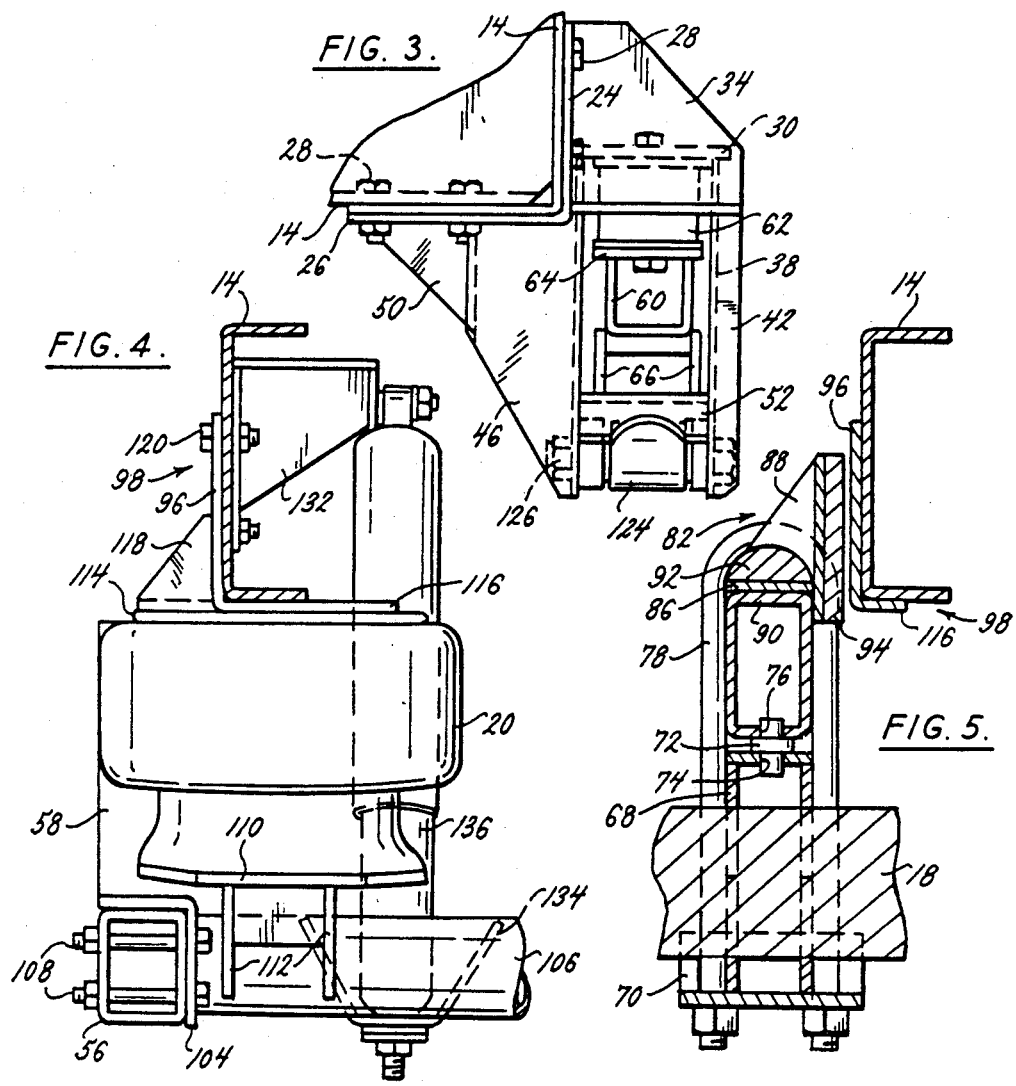
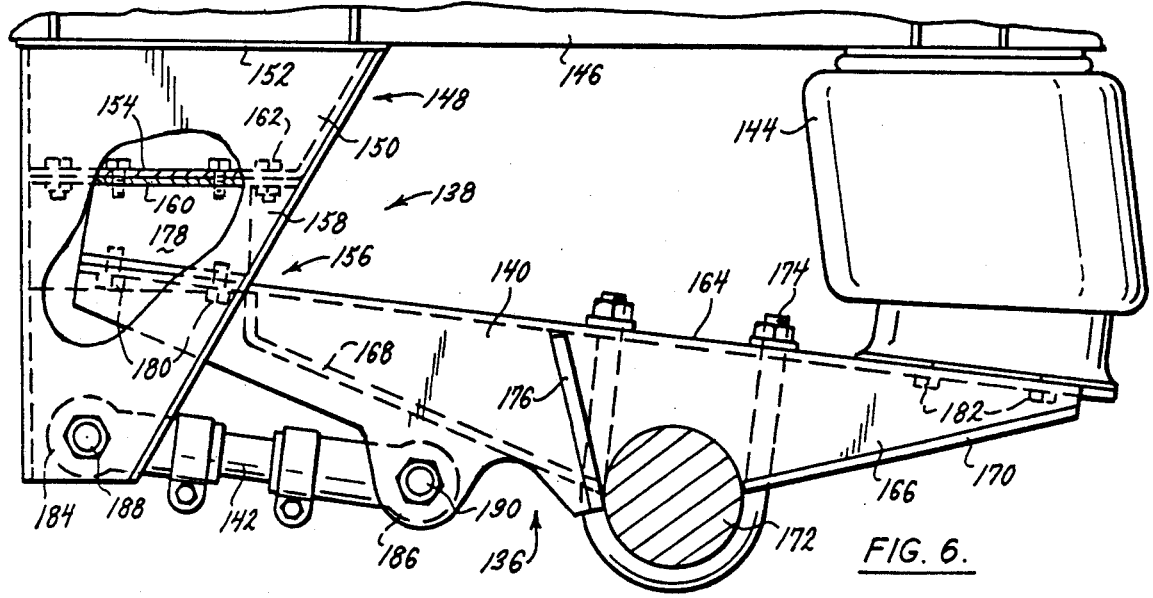

5,013,063

AIR RIDE SUSPENSION SYSTEM WITH RIGID BOLSTER BEAM AND SLIPPER LOAD BUSHING

BACKGROUND OF THE INVENTION:

(1) Field of the Invention:

The present invention relates to air ride suspension systems for vehicles having a bolster beam pivotally connected to a hanger and supporting a vehicle axle, where the bolster beam bears the load of the vehicle without loading its pivot connection to the hanger.

(2) Description of the Related Art:

Air ride suspension systems of the type provided by the present invention commonly comprise a pair of hanger members suspended from opposite sides of the vehicle chassis. A beam/axle seat assembly supporting an axle seat and vehicle axle at one end is pivotally connected to each hanger member by a torque rod at its opposite end. An air spring positioned between each beam/seat assembly and the vehicle chassis transmits the vehicle load to the beam/seat assembly.

The pivoting connections of the torque rods between the beams of the beam/seat assemblies and the hanger members controls the pitch of the vehicle axle as it oscillates relative to the vehicle chassis when driving over uneven roads, and maintains the alignment of the drive line with the axle. The torque rods have pivot bushing connections at their opposite ends to the hanger members and the beams. A drawback of this type of arrangement is that many suspension system configurations employing torque rods subject the pivot bushing connections of the torque rods to a portion of the vehicle load. The loading of the pivot bushings substantially reduces their useful life.

It is therefore an object of the present invention to provide a vehicle suspension system utilizing torque rods to control up and down axle movement as the vehicle travels over uneven roads, where the unique configuration of the system minimizes or eliminates a portion of the vehicle load from being carried by the pivot bushings of the torque rods.

SUMMARY OF THE INVENTION

The rigid bolster beam suspension system of the present invention comprises a pair of suspension assemblies, each positioned on opposite sides of the vehicle chassis. Each assembly includes a hanger member that is suspended from a vehicle chassis member on an outboard side of the chassis. a pair of vertical side walls and a horizontal plate connected between the side walls.

A bolster beam having first and second ends supports the vehicle axle. In a first embodiment used with a drive axle, the bolster beam is in the form of a step beam that includes a generally horizontal forward section, a generally horizontal rearward section, and a generally vertical intermediate section connecting the forward and rearward sections. In a second embodiment of the invention used for a trailer axle, the bolster beam is substantially horizontal across its entire length. A torque rod has an end pivotally mounted to a lower portion of the hanger member side walls by a bushing. The other end of the torque rod is pivotally mounted to the underside of the bolster beam by another bushing.

A spring of solid elastic material is positioned between the first end of the bolster beam and the horizontal plate of the hanger member. An air spring is positioned between the second end of the bolster beam and a vehicle chassis member. The solid and air springs bear substantially the entire vertical load transmitted from the vehicle chassis to the bolster beam. The torque rod allows vertical movement between the bolster beam and the chassis while restricting longitudinal movement of the axle as allowed by the bushing connections of the torque rod to the hanger and bolster beam.

In the first embodiment of the invention, a beam guide member is secured to the upper surface of the bolster beam adjacent a side surface of the vehicle chassis. The beam guide restricts lateral movement of the axle as the bolster beam and its supported axle oscillate relative to the vehicle chassis. The bolster beam can be connected in either overslung or underslung fashion to the axle.

BRIEF DESCRIPTION OF THE DRAWINGS

Further objects and features of the present invention are revealed in the following detailed description of the preferred embodiments of the invention and in the drawing figures, wherein:

FIG. 1 is a side elevation view of the first embodiment of the vehicle air ride suspension system of the present invention;

FIG. 2 is a plan view of the first embodiment of the suspension system of the present invention;

FIG. 3 is an elevation view of the hanger member taken along the line 3—3 of FIG. 1;

FIG. 4 is an elevation view of the air spring assembly taken along the line 4—4 of FIG. 1;

FIG. 5 is an elevation view in section of the beam guide and the connection between the bolster beam and the vehicle axle taken along the line 5—5 of FIG. 1;

FIG. 6 is an elevation view of a second embodiment of the air ride suspension system of the present invention.

DESCRIPTION OF THE PREFERRED EMBODIMENTS

Figure 7:
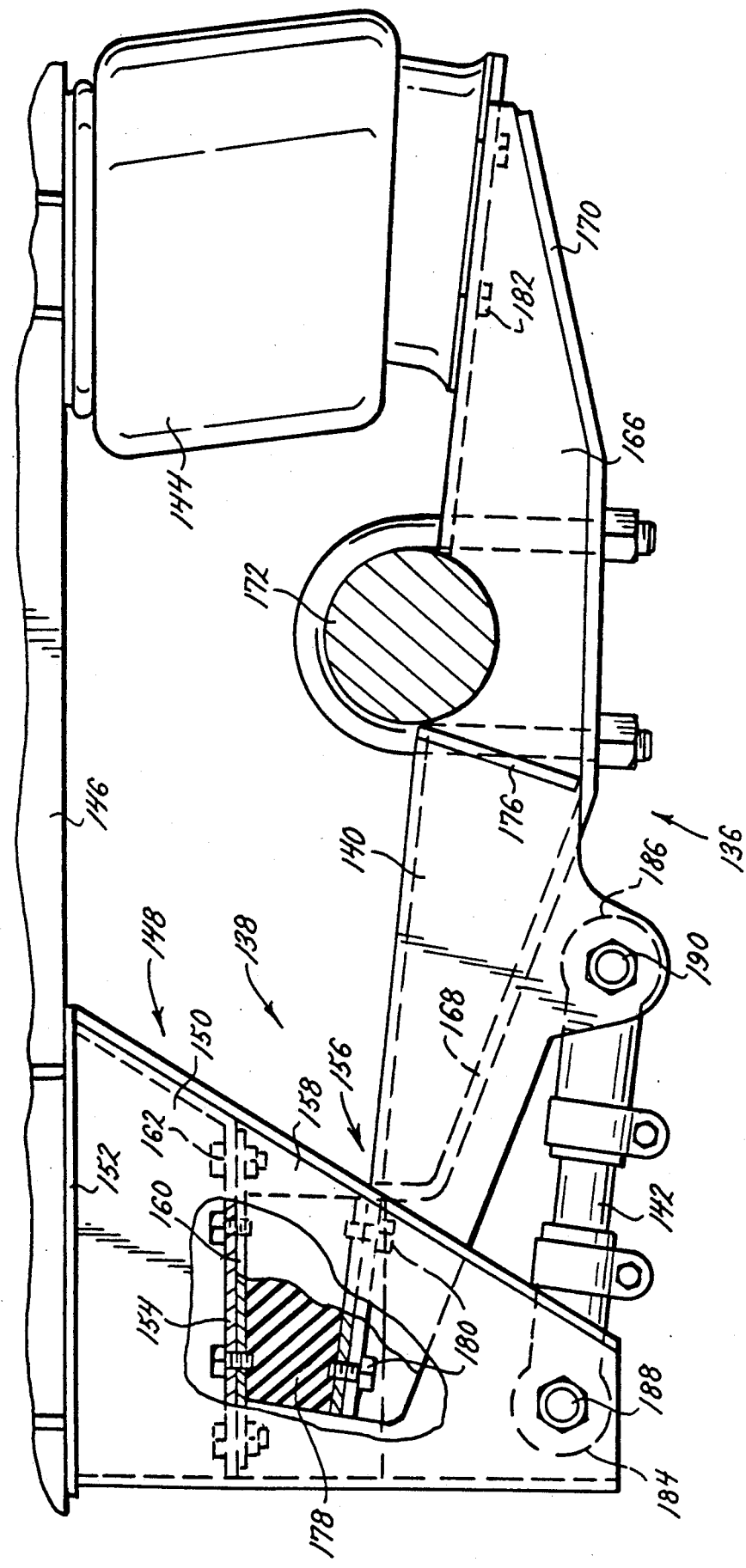
FIG. 7 is an elevation view of the third embodiment of the present invention supporting an underslung axle.

FIG. 1 shows the vehicle air ride suspension system 10 of the present invention employing a rigid bolster beam and a load bushing or spring. The suspension system comprises a hanger assembly 12 secured to the underside of a vehicle chassis member 14, a bolster beam assembly 16 pivotally connected to the hanger assembly and supporting an overslung vehicle axle 18, typically a steering axle, and an air spring 20 mounted between the bolster beam assembly and the vehicle chassis member. It should be understood by those skilled in the art that the suspension system described with reference to the drawing figures is only one-half of a complete suspension system, and that a suspension system like that shown in the drawing figures is mounted to the vehicle chassis on the opposite side of the vehicle.

The hanger assembly 12 comprises an angled hanger plate 22 with a vertical plate member 24 secured to a side of the chassis member 14 and a horizontal plate member 26 secured to the underside of the chassis member 14. The hanger plate is secured to the chassis member by nut and bolt fasteners 28. An outboard horizontal plate 30 extends outward from the vertical plate 24 of the angled hanger plate 22. The outboard plate 30 is reinforced in its position by a middle gusset 32 connected between the outboard plate 30 and the vertical plate 24, and a pair of outside gussets 34, 36 connected between the forward and rearward edges of the outboard plate 30, respectively, and the vertical plate 24 of the angled hanger plate 22. An outboard vertical side wall 38 and an inboard vertical side wall 40 extend downward from the outboard horizontal plate 30. The outboard vertical side wall has outwardly turned forward and rearward flange edges 42, 44 that provide lateral reinforcement of the side wall. The inboard side wall 40 has inwardly turned forward and rearward flange edges 46, 48 providing lateral reinforcement of the inboard side wall. The flange edges of the inboard side wall are connected to the horizontal plate 26 of the angled hanger plate 22 along their top edges. A reinforcing gusset 50 is also connected between the flange edges 46, 48 of the inboard side wall and the horizontal plate 26 of the angled hanger plate 22. A pair of coaxial holes (not shown) are provided through the lower extremes of the outboard and inboard side walls to permit the pivot mounting of a torque rod to the hanger assembly in a manner to be described later. An angled reinforcement plate 52 is connected between the outboard and inboard side walls 38, 40 just above the coaxial holes to increase the rigidity of the lower portion of the hanger assembly.

The bolster beam assembly 16 is in the form of a step beam having a generally horizontal forward section 54, a generally horizontal rearward section 56, and a generally vertical intermediate section 58 connecting the forward and rearward sections. The first end 60 of the forward section 54 of the beam is inserted between the side walls 38, 40 of the hanger assembly 12. A solid spring 62 of solid elastic material is connected between a top plate 64 of the first end 60 of the forward beam section 54 and the outboard horizontal plate 30 of the hanger assembly 12. A pair of pivot brackets 66 are connected to and extend downward from the bottom surface of the forward beam section 54. The pivot brackets have coaxial holes (not shown) through their bottom extremes.

An axle seat assembly supporting the vehicle axle 18 is secured to the underside of the beam forward section 54. The axle seat assembly comprises an upper seat member 68 and a lower seat member 70 positioned around the vehicle axle 18. The upper seat member 68 is secured relative to the forward beam section 54 by a pin 72 extending through a hole 74 in the top surface of the upper seat member 68 and a hole 76 in the bottom surface of the forward beam section 54. The beam seat assembly is secured around the vehicle axle and to the underside of the forward beam section by a pair of extended U bolts 78, 80.

Directly above the vehicle axle and axle seat is a beam guide 82 that is also secured to the forward beam section by the U bolts 78, 80. The beam guide includes a vertical plate 84 and a horizontal member 86 secured to the vertical plate by gusset members 88. The horizontal member 86 has a flat bottom surface 90 to mate with the top of the forward beam section 54 and a semicircle top surface 92 to mate with the curvature of the U bolts 78, 80. A bearing surface 94 is secured to the vertical plate 84 and is spaced laterally from a vertical side plate 96 of an angled air spring bracket 98 attached to the vehicle chassis 14. The bearing surface 94 of the beam guide 82 is positioned to maintain the proper lateral spacing of the bolster beam assembly 16 outboard of the vehicle chassis member 14 and thereby restrict lateral movement of the axle as the vehicle axle 18 oscillates up and down. Threaded fasteners 100 secure the bearing surface 94 to the vertical plate 84 of the beam guide.

The second end 102 of the forward beam section 54 extends behind the axle and axle seat assemblies and is connected to the top of the intermediate beam section 58. The intermediate beam section 58 extends vertically downward from its connection with the second end of the forward beam section 54 at an angle to the forward beam section that is slightly more than 90°. The bottom of the intermediate beam section 58 is connected to the forward end of the rear beam section 56, forming an angle between the intermediate section 58 and the rear section 56 of slightly more than 90°.

A cross beam bracket 104 secured to an end of a cross beam 106 is connected to the rear beam section 56 by threaded fasteners 108. The opposite end of the cross beam 106 is secured to the rear beam section of the suspension system on the opposite side of the vehicle in a like manner.

The air spring 20 is mounted between the bolster beam assembly 16 and the vehicle chassis member 14. A bottom plate 110 of the air spring 20 is connected to the cross beam 106 by web members 112. A top plate 114 of the air spring 20 is connected to a horizontal plate 116 of the angled air spring bracket 98. Gusset members 118 are connected between the top plate 114 of the air spring and the vertical side plate 96 of the angled air spring bracket 98. The angled air spring bracket 98 is secured to the chassis member 14 by threaded fasteners 120.

A torque rod 122 is pivotally connected between the hanger assembly 12 and the bolster beam assembly 16. The torque rod comprises a pivot bushing (not shown) in its first end 124 that is pivotally mounted on the hanger assembly 12 by a nut and bolt fastener 126. The fastener 126 extends through the hole in the outboard side wall 38, the pivot bushing mounted in the first end of the torque rod, and the hole in the inboard side wall 40.

A second pivot bushing (not shown) is mounted in the second end of the torque rod 128 and is pivotally connected to the pivot brackets 66 of the forward beam section 54 by a nut and bolt fastener 130. The fastener 130 extends through the hole in the outboard pivot bracket 66, the pivot bushing secured in the second end of the torque rod 128, and the hole in the inboard pivot bracket 66.

An upper shock absorber bracket 132 is connected to the inboard surface of the chassis member 14 by the same fasteners 120 that connect the angled air spring bracket 98 to the outboard surface of the chassis member. A lower shock absorber bracket 134 is connected to the cross beam 106 by welds. A shock absorber 136 is connected between the upper and lower shock absorber brackets.

In this first embodiment of the invention, the vertical load borne by the vehicle chassis 14 is transmitted from the chassis through the first spring 62 and the second air spring 20 to the forward bolster beam section 54 and the rearward bolster beam section 56, respectively. The load on the bolster beam assembly is transmitted directly to the vehicle axle 18 by the axle seat members 68, 70. Substantially none of the vehicle vertical load is carried by the bushing mounting the firs end 124 of the torque rod 122 to the hanger assembly 12 or the bushing mounting the second end 128 of the torque rod to the pivot brackets 66 of the forward bolster beam section 54. The torque rod 122 functions to restrict longitudinal movement of the vehicle axle 18 relative to the chassis 14 as the axle oscillates up and down from the vehicle traveling over an uneven road while carrying substantially none of the vehicle load. The springs 62, 20 also permit slight torque vibrations of the axle due to vehicle braking or shift shock, but dampen the forces transmitted to the vehicle chassis. The beam guide 82 secured to the top of the forward bolster beam section 54 maintains the proper lateral orientation of the bolster beam assembly 16 relative to the chassis member 14 as the vehicle axle 18 and bolster beam assembly 16 oscillate up and down.

The second embodiment of the air ride suspension system 136 of the present invention is shown in FIG. 6. Like the first embodiment, the system of the second embodiment also comprises a hanger assembly 138, a bolster beam 140, a torque rod 142 and an air spring 144. The hanger 138 is suspended from beneath a vehicle chassis member 146 in much the same manner as in the first embodiment. An upper portion of the hanger member 148 is secured to the underside of the chassis member 146 by either welds or nut and bolt fasteners (not shown).

The upper portion of the hanger member includes a pair of opposed side walls 150 secured at their top edge to a hanger plate 152 that is secured to the underside of the vehicle chassis member, and secured at their bottom edge to an upper horizontal plate 154. A lower portion of the hanger member 156 below the horizontal plate 154 comprises a pair of opposed side walls 158 that are extensions of the upper side walls 150. The upper horizontal plate 154 is secured to a spring plate 160 by nut and bolt fasteners 162. The spring plate 160 is secured to the top surface of the spring 178 either by bonding and/or threaded fasteners, or by some other means. The opposed side walls 158 of the lower portion of the hanger member 156 have coaxial holes at their lower extremes (not shown) for the mounting of a pivot bushing of a torque rod in a manner to be described.

The bolster beam 140 of the second embodiment is formed from a straight beam member having a generally U-shaped cross section with a flat top surface 164 and opposed side walls 166. An internal plate 168 is connected between a forward portion of the side walls and external flanges 170 are connected along the edges of the side walls at a rearward end of the bolster beam. The internal plate and external flanges provide additional support and increase the rigidity of the bolster beam.

A vehicle axle 172, typically a trailer axle for this embodiment, is supported beneath the bolster beam by U bolts 174. An additional external flange 176 is secured to the beam side walls and provides support for the axle U bolts 174. On a forward first end of the beam, a spring of solid elastic material 178 is secured to the top surface 164 by bonding and/or threaded fasteners 180. The spring 178 is secured to the plate 160, and the plate 160 is secured to the plate 154 by threaded fasteners 162. At a rearward second end of the beam, the air spring 144 is secured to the top surface 164 of the beam by threaded fasteners 182. The top of the air spring 144 is secured to the underside of the vehicle chassis member 146 in any known manner. A pair of coaxial holes (not shown) are provided through the beam side walls 166 just forward of the overslung vehicle axle 172.

The torque rod 142 is connected between the holes (not shown) provided in the lower portions of the hanger side walls 158 and the holes (not shown) provided in the lower portions of the bolster beam side walls 166. As in the first embodiment, the torque rod 142 has pivot bushing assemblies (not shown) secured in its first and second ends 184, 186. The pivot bushing at the first end of the torque rod 184 is secured to the lower hanger member 156 by inserting a bolt of a nut and bolt fastener 188 through the hole in one side wall 158, through the bushing assembly in the first end 184 of the torque beam, and through the hole in the opposite side wall 158 of the hanger assembly and securing the bolt in place. The second end 186 of the torque rod is pivotally connected with the bolster beam 140 by passing a bolt of a nut and bolt fastener 190 through a hole in the side wall 166 of the beam, through the pivot bushing assembly secured in the second end 186 of the torque rod, and through the hole in the opposite side wall 166 of the bolster beam and securing the fastener in place.

The second embodiment of the air ride suspension system described with reference to FIG. 6 functions substantially as the first embodiment. The load of the vehicle borne by the vehicle chassis is transferred through the hanger 138 and the spring 178 of solid elastic material and the air spring 144 to the first and second ends of the bolster beam 140, respectively. The vehicle vertical load transferred to the bolster beam is ultimately borne by the overslung vehicle axle 172 supported by the beam. In this manner, the air ride suspension system of the second embodiment substantially reduces or eliminates the vertical load of the vehicle carried by the bushings mounting the first end 184 of the torque rod 142 to the hanger 138 and the second end 186 of the torque rod to the bolster beam.

A third embodiment of the air ride suspension system is shown in FIG. 7 and is substantially identical to the second embodiment except that it supports an underslung axle 172'. The remaining components of this embodiment are substantially the same as those described with reference to FIG. 6, and therefore are not further described.

While the present invention has been described by reference to specific embodiments, it should be understood that modifications and variations of the invention may be constructed without departing from the scope of the invention defined in the following claims.

What is claimed is:

1. An air ride suspension system for a vehicle having a chassis and at least one axle, the system comprising:
    a hanger means adapted to be connected to a vehicle chassis;
    a bolster beam means having first and second ends and adapted to support a vehicle axle;
    a first spring means positioned between the first end of the bolster beam means and the vehicle chassis;
    a second spring means positioned between the bolster beam means and the vehicle chassis at a location spaced from the first end; and
    a torque rod having a first end connected to the hanger means below the first spring means, and a second end connected to the bolster beam means underneath the bolster beam and intermediate the first and second ends of the bolster beam.

2. The suspension system of claim 1 comprising:
    the torque rod being positioned directly below the bolster beam means.

3. The suspension system of claim 1 comprising:
    the first spring means being a solid rubber spring and the second spring means being an air spring.

4. The suspension system of claim 1 comprising:
the first end of the torque rod being pivotally connected to the hanger means and the second end of the torque rod being pivotally connected to the bolster beam means beneath the bolster beam means.

5. The suspension system of claim 1 comprising:
the first end of the torque rod being connected to the hanger means directly below the first spring means.

6. The suspension system of claim 5 comprising:
the bolster beam means and the torque rod are both positioned outboard of the vehicle chassis.

7. The suspension system of claim 1 comprising:
the bolster beam means being adapted to support a vehicle axle intermediate its second end and its connection to the second end of the torque rod.

8. The suspension system of claim 1 comprising:
the bolster beam means being adapted to support an underslung vehicle axle.

9. The suspension system of claim 1 comprising:
the bolster beam means being adapted to support an overslung vehicle axle.

10. The suspension system of claim 1 comprising:
the bolster beam means including a beam guide adapted to maintain a relative lateral spacing between the bolster beam means and the vehicle chassis.

11. The suspension system of claim 1 comprising:
the bolster beam means including a beam adapted to move vertically relative to the vehicle chassis, and a beam guide secured to the beam and adapted to maintain a lateral spacing between the beam and the vehicle chassis.

12. The suspension system of claim 1 comprising:
the bolster beam means including a beam having a forward, generally horizontal section, a rearward generally horizontal section, and an intermediate generally vertical section connecting the forward section to the rearward section.

13. The suspension system of claim 12 comprising:
the first spring means, the second end of the torque rod, and the vehicle axle all being connected to the forward section of the beam, and the second spring means being connected to the rearward section of the beam.

14. The suspension system of claim 1 comprising:
the first spring means being connected to the vehicle chassis.

15. The suspension system of claim 1 comprising:
the first spring means being adapted to bear against the hanger means and to resiliently deform longitudinally relative to the vehicle chassis.

16. The suspension system of claim 1 comprising:
the hanger means including a pair of opposed side walls with a space provided therebetween, the first end of the bolster beam means extending into an upper area of the space between the side walls and the first end of the torque rod extending into a lower area of the space between the side walls.

17. The suspension system of claim 16 comprising:
the first spring means being positioned between the opposed side walls.

18. An air ride suspension system for a vehicle having a chassis and at least one axle, the system comprising:
a hanger suspended outboard from a vehicle chassis member;
a bolster beam having first and second ends and supporting a vehicle axle intermediate its first and second ends;
a spring of solid elastic material positioned between the first end of the bolster beam and the hanger;
an air spring positioned between the second end of the bolster beam and the vehicle chassis; and
a torque rod positioned beneath the bolster beam, with a first end of the torque rod pivotally connected to the hanger and a second end of the torque rod pivotally connected to the bolster beam.

19. The suspension system of claim 18 comprising:
the second end of the torque rod being pivotally connecting to the underside of the bolster beam.

20. The suspension system of claim 18 comprising:
the hanger including a pair of spaced vertical side walls with a horizontal plate connected between the side walls, the first end of the torque rod being pivotally mounted between the side walls and the spring of solid material engaging the horizontal plate.

21. The suspension system of claim 20 comprising:
the horizontal plate being spaced vertically above a lower edge of the vehicle chassis member.

22. The suspension system of claim 20 comprising:
the horizontal plate being spaced vertically below a lower edge of the vehicle chassis member.

* * * * *